(12) United States Patent
Pei-Breivold et al.

(10) Patent No.: US 11,090,809 B2
(45) Date of Patent: Aug. 17, 2021

(54) DYNAMIC ALLOCATION OF PROCESSING TASKS FOR A ROBOT CELL

(71) Applicant: ABB Schweiz AG, Baden (CH)

(72) Inventors: Hongyu Pei-Breivold, Västerås (SE); Kristian Sandström, Västerås (SE); Larisa Rizvanovic, Västerås (SE); Marko Lehtola, Västerås (SE); Roger Kulläng, Västerås (SE); Saad Azhar, Västerås (SE)

(73) Assignee: ABB Schweiz AG, Baden (CH)

( * ) Notice: Subject to any disclaimer, the term of this patent is extended or adjusted under 35 U.S.C. 154(b) by 359 days.

(21) Appl. No.: 16/303,347

(22) PCT Filed: May 23, 2016

(86) PCT No.: PCT/EP2016/061537
§ 371 (c)(1),
(2) Date: Nov. 20, 2018

(87) PCT Pub. No.: WO2017/202439
PCT Pub. Date: Nov. 30, 2017

(65) Prior Publication Data
US 2019/0168387 A1 Jun. 6, 2019

(51) Int. Cl.
*B25J 9/16* (2006.01)
*G05B 19/418* (2006.01)

(52) U.S. Cl.
CPC .............. *B25J 9/1682* (2013.01); *B25J 9/161* (2013.01); *B25J 9/1617* (2013.01); *B25J 9/1661* (2013.01);
(Continued)

(58) Field of Classification Search
CPC ........ B25J 9/1664; B25J 9/0084; B25J 9/162; B25J 9/1656; B25J 9/1682; B25J 9/1617;
(Continued)

(56) References Cited

U.S. PATENT DOCUMENTS

| 5,218,709 A | 6/1993 | Fijany et al. |
| 6,434,448 B1* | 8/2002 | Kosaka ............... B25J 9/1674 318/568.11 |

(Continued)

FOREIGN PATENT DOCUMENTS

EP 1176486 A1 1/2002

OTHER PUBLICATIONS

International Search Report and Written Opinion of the International Searching Authority Application No. PCT/EP2016/061537 completed: Jan. 31, 2017; dated Feb. 7, 2017 14 pages.

(Continued)

*Primary Examiner* — Dalena Tran
(74) *Attorney, Agent, or Firm* — Whitmyer IP Group LLC

(57) ABSTRACT

The invention concerns a method, arrangement and computer program product for distributing processing for a first robot in a cell among more than one processing entities. The arrangement includes a processing entity determining unit that obtains data about current limitations in the processing environment of a prospective processing entity intended to perform a processing task for the first robot, determines, based on the processing environment limitations, whether a performance requirement will be fulfilled or not if the task is performed in the prospective processing entity, and assigns the processing task for processing in the prospective processing entity or in at least one other processing entity based on the determining of whether the performance requirement is fulfilled or not.

17 Claims, 3 Drawing Sheets

(52) U.S. Cl.
CPC ............... *G05B 19/4185* (2013.01); *G05B 2219/33104* (2013.01); *G05B 2219/33334* (2013.01); *G05B 2219/39167* (2013.01); *G05B 2219/39252* (2013.01)

(58) Field of Classification Search
CPC ......... B25J 9/1661; G05B 2219/25347; G05B 2219/39146; G05B 19/4185; Y10S 901/04; Y10S 901/46
USPC ....................................................... 700/245
See application file for complete search history.

(56) References Cited

U.S. PATENT DOCUMENTS

| | | | |
|---|---|---|---|
| 7,302,312 B2 * | 11/2007 | Murray, IV | B25J 9/161 318/568.11 |
| 7,684,876 B2 | 3/2010 | Grgic | |
| 9,008,839 B1 * | 4/2015 | Kuffner, Jr. | G05B 19/4187 700/248 |
| 2005/0055132 A1 | 3/2005 | Matsumoto et al. | |
| 2013/0166621 A1 | 6/2013 | Zhu | |
| 2014/0142750 A1 | 5/2014 | Ahn et al. | |

OTHER PUBLICATIONS

Yamini Nimmagadda et al: "Real-time moving object recognition and tracking using computation offloading", Intelligent Robots and Systems (IROS), 2010 IEEE/RSJ International Conference on, IEEE, Piscataway, NJ, Oct. 18, 2010 pp. 2449-2455.

* cited by examiner

DYNAMIC ALLOCATION OF PROCESSING TASKS FOR A ROBOT CELL

TECHNICAL FIELD

The present invention relates to the field of robots. The invention more particularly relates to a method, arrangement and computer program product for distributing processing for a first robot in a cell among more than one processing entities.

BACKGROUND

Robots are frequently used within industry in a variety of operations such as for manufacturing objects.

In such operations the activities of a robot may be performed based on computer processing made for the robot. Processing may for instance be image processing. The performance of the operation in a robot cell may furthermore need to fulfill various performance requirements, often denoted quality of service requirements (QoS). One important such requirement is the speed of the processing. It may for instance be necessary that the processing made in relation to a robot is delivered on time in order for the robot to be used in a process control activity. Another is the granularity or resolution of the processing. The result of the processing may for instance require a certain precision in order for the end result to be acceptable.

Furthermore, some robot activities may require extensive processing, which processing is typically performed in an associated robot controller.

One example of a task requiring such extensive use of processing resources is robot vision algorithm computation. Vision systems enable robots to perform operations with improved performance. For instance, robots guided by a vision system can locate parts to be picked up, determine where to apply a weld, inspect parts that have been assembled, and determine where to place a part. A vision system provides feedback signals that are essential for robot controllers to perform these operations precisely, which requires huge amount of computations involving image processing algorithms, vision sensory feedback and complicated signal processing.

A robot may also have very strict timing requirements, meaning that the above-mentioned heavy processing would have to be finished before a certain activity is carried out.

It may in this regard be impossible for a robot controller to perform the heavy processing required while at the same fulfilling the timing requirement. If this is not handled production may be jeopardized.

One way of addressing such a problem is to statically distribute processing. It is for instance possible to have the vision algorithm computation performed in another processing entity than the robot controller controlling the robot. It is for instance possible to assign processing for a robot to a cloud computing environment. One example of this is disclosed in US 2013/0166621. According to this document, whenever computations are demanded for a robot, these are then made in the cloud.

However, cloud computing is not always advantageous. There may for instance be communication limitations with the cloud that could result in that a performance requirement of a robot cell not being fulfilled. It can thus be seen that the performance of a robot as controlled by a robot controller may be negatively influenced also by the communication limitations.

The computing resources in a robot controller may also at times be too limited, which may also negatively influence the performance. The resources may not be enough in the robot controller for performing the computational task. Furthermore as one robot controller lacks sufficient processing resources, it is possible that another computing entity does.

The characteristic of robotics automation control requires deterministic real-time applications and computation services. With huge amount of devices (sensors, actuators, programmable logic controllers, etc.) connected, direct feedback from real-time robotics data analytics services in closed-loop control with satisfying response time is essential. At present the data analytics and computation services are as mentioned above typically statically defined during design time to be executed on dedicated servers, either locally within specific robot controllers or remote servers in cloud for analysis.

Therefore, so far there has been no flexibility to redirect computation services dedicated to a specific robot controller with available processing resources or to the cloud depending on the changing conditions of network bandwidth, processor performance, available memory, amount of data needed for the operation, etc.

It can thereby be seen that there exists a need for a more versatile and flexible use of processing resources in relation to the control of a robot.

If such computations can be redirected to the cloud or to other local robot controllers with available processing resources dynamically in runtime depending on the changing conditions of the above mentioned parameters, it would be possible to meet the timing and deterministic requirements (QoS) of robot applications.

Therefore it may be of interest to use a dynamic determination of the location for processing in respect of a robot.

SUMMARY

The present invention is therefore directed towards providing a dynamic determination of the location of processing performed for a robot in a robot cell.

This object is according to a first aspect of the present invention achieved through a method for distributing processing for a first robot in a cell among more than one processing entities, the first robot being controlled by a first robot controller that is also one of the processing entities, the method being performed by a processing entity determining unit and comprising the steps of:

obtaining data about current limitations in the processing environment of a prospective processing entity intended to perform a processing task for the first robot, determining, based on the processing environment limitations, whether a performance requirement will be fulfilled or not if the task is performed in the prospective processing entity, and assigning the processing task for processing in the prospective processing entity or in at least one other processing entity based on the determining of whether the performance requirement is fulfilled or not.

The object is according to a second aspect of the present invention achieved through an arrangement for distributing processing for a first robot in a cell among more than one processing entities, the first robot being controlled by a first robot controller that is also one of the processing entities, the arrangement comprising a processing entity determining unit configured to obtain data about current limitations in the processing environment of a prospective processing entity intended to perform a processing task for the first robot, determine, based on said processing environment limitations, whether a performance requirement will be fulfilled or not if the task is performed in the prospective processing entity, and assign the processing task for processing in the prospective processing entity or in at least one other processing entity based on the determining of whether the performance requirement is fulfilled or not.

The object is according to a third aspect of the present invention achieved through a computer program product for distributing processing for a first robot in a cell among more than one processing entities, the first robot being controlled by a first robot controller that is also one of the processing entities, the computer program product comprising a data carrier with computer program code which when run in a processing entity of the cell provides a processing entity determining unit that:

obtains data about current limitations in the processing environment of a prospective processing entity intended to perform a processing task for the first robot, determines, based on said processing environment limitations, whether a performance requirement will be fulfilled or not if the task is performed in the prospective processing entity, and assigns the processing task for processing in the prospective processing entity or in at least one other processing entity based on the determining of whether the performance requirement is fulfilled or not.

The present invention has many advantages. It dynamically allocates processing entities to perform processing of a task depending on how performance requirements are met. This may improve the quality of control. The flexibility of processing is furthermore increased, which allows savings to be made in the how many processing resources are used in a cell and also allows abnormal situations to be handled.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

Figure 1:
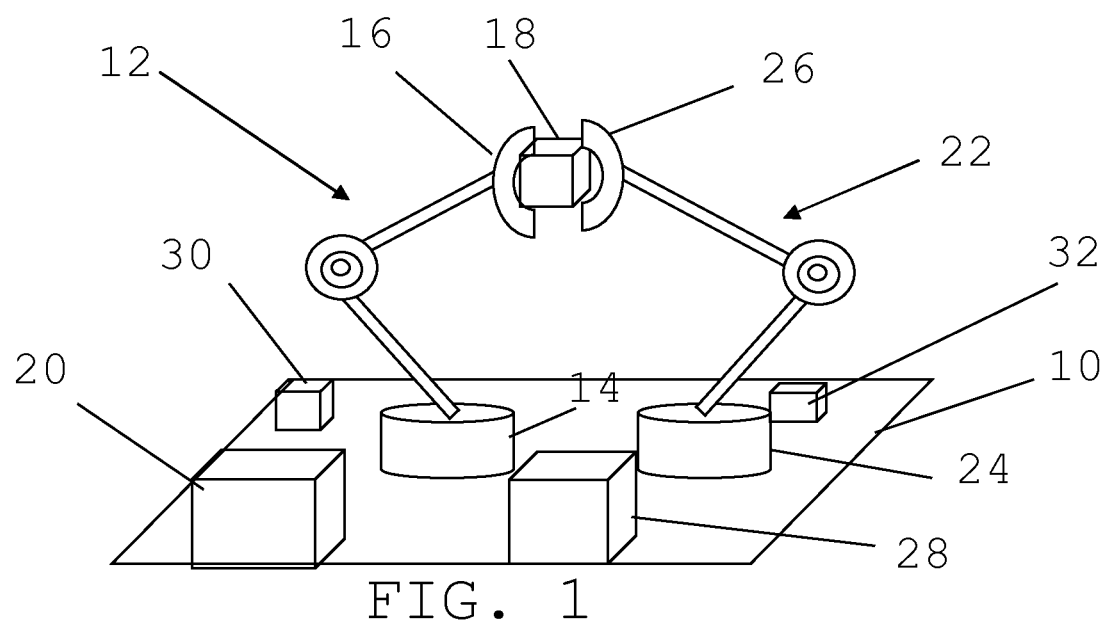
FIG. 1 schematically shows a robot cell with two robots together with corresponding robot controllers and further processing entities, FIG. 2 schematically shows the robot controllers and the further processing entities of the cell connected to a local communication network, which in turn is connected to the internet.

FIG. 1 schematically shows a robot cell 10. The cell 10 comprises an area in which there is a first robot 12 on a first foundation 14, which first robot 12 is equipped with a first tool 16 for holding an object 18, and where the object may be a product or may be used in the forming of a product. In the cell 10 there is also a second robot 22 on a second foundation 24, which second robot 22 is equipped with a second tool 26 for holding an object 18, which in this case is the same object 18 held by the first robot 12. Therefore, the two robots 12 and 22 are here cooperating in the handling of the object 18.

The number of robots shown in the cell is exemplifying. It should be realized that there may be more robots in the cell, but also fewer. However, all robots in the cell are members of a common collaborative group, i.e. a group collaborating in performing a number of correlated or synchronized activities such as for producing products.

The first robot 12 is, as was mentioned above, in this example involved in the production of a product. This means that the first tool 16 may be moved along a first robot movement path while performing a first number of activities. In a similar manner the second tool 26 may be moved along a second robot movement path while performing a second number of activities.

In order to perform control of these robots as well as processing in relation to these activities, there is furthermore a first robot controller 20 for controlling the first robot 12 and a second robot controller 28 for controlling the second robot 22. The robot controllers 20 and 28 are both examples of processing entities that perform processing in respect of the cell and in this case also in respect of a corresponding robot.

In or at the cell 10 there may be a number of further processing entities. As an example there is a first further processing entity 30 which processes data provided by a first sensor and a second further processing entity 32 that processes data provided by a second sensor, where examples of sensors are cameras and temperature sensors. Processing in relation to a sensor is merely one example of the use of a further processing entity.

Figure 2:
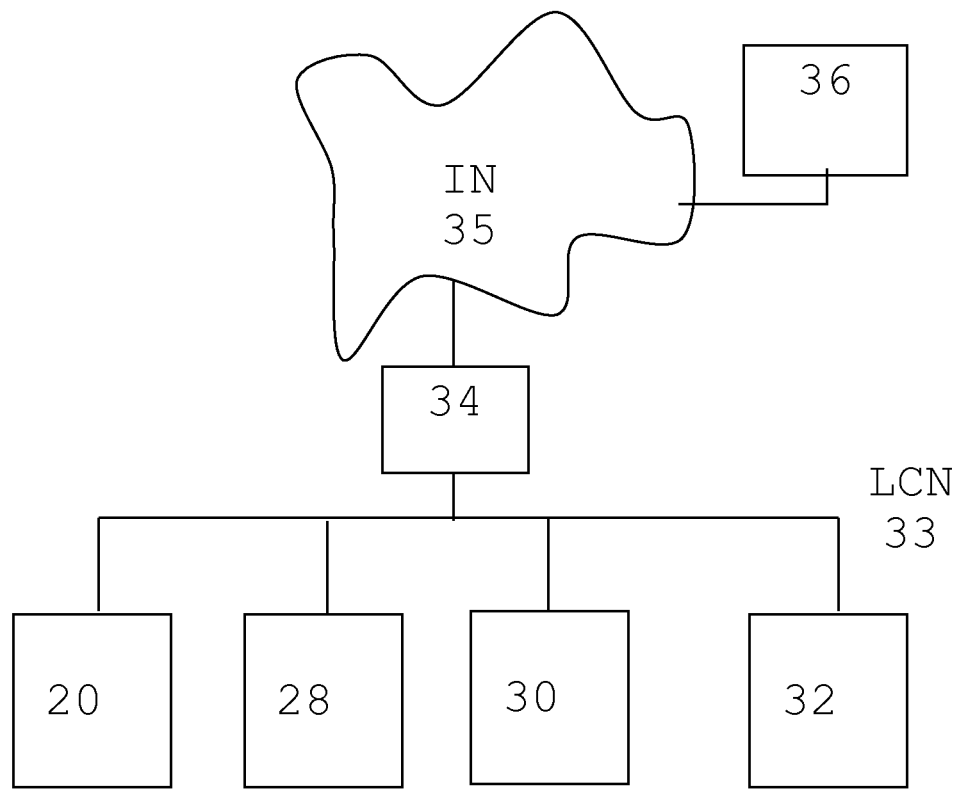

FIG. 2 schematically shows the various processing entities of the cell being connected to a local communication network LCN 33, such as a local area network (LAN), which may be a private network with restricted access. To this local communication network 33 there is also connected a gateway 34, which provides connectivity for devices of the local communication network 33 to a public network 35 such as the Internet IN. Via the gateway 34 the processing entities may for instance access a cloud computing device 36, which may be a cloud computing server in a cloud computing service center or a premises server park (local cloud). Also this cloud computing device 36 is a processing entity performing processing associated with the cell, which may be processing for one or more of the robots of the collaborative group.

Figure 3:
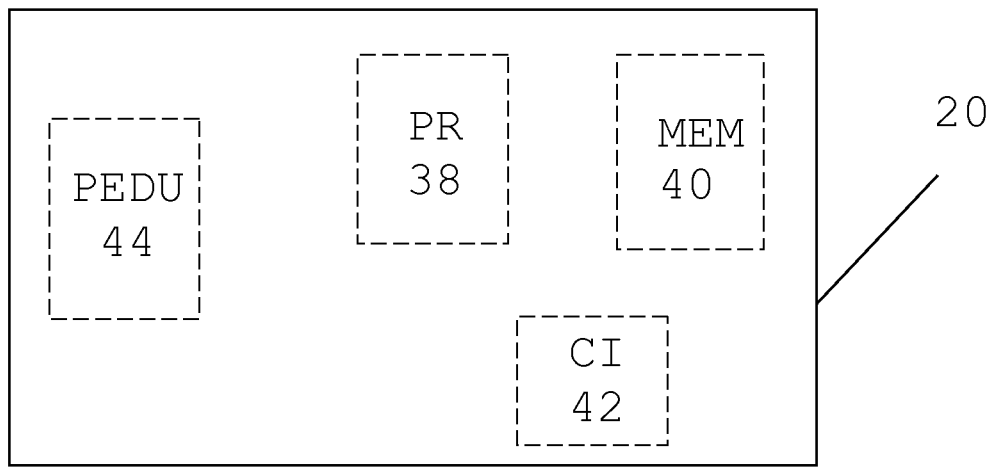
FIG. 3 shows a block schematic of relevant parts of the first robot controller.

FIG. 3 shows a block schematic of some of the elements of the first robot controller 20 that are relevant to the present invention. It comprises a processor PR 38 and a memory MEM 40 as well as a communication interface CI 42 for communicating on the local communication network 33. It also comprises a processing entity determining unit PEDU 44. Although the processing entity determining unit 44 is shown as being separate from the processor and memory, it should be realized that the processing entity determining unit 44 may in fact be implemented using the processor 38 and memory 40. However, one of the roles of processing entity determining unit 44 is to monitor processing resources of a processing entity. The processor 38 and memory 40 are such processing resources of the first robot controller 20. Therefore, in order to illustrate that the processing determining unit 44 may monitor the processing resources of the first robot controller 20, it is shown as a separate element.

It should also be realized that the first robot controller 20 may comprise more elements and units. However, as these are not central to the understanding of the invention, they have been omitted.

Figure 4:
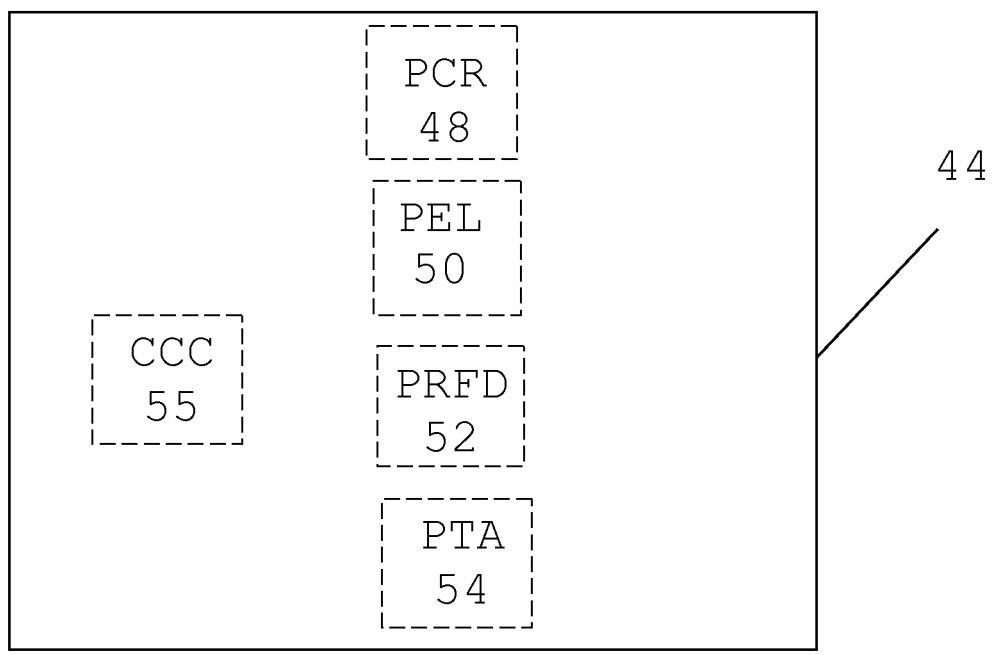
FIG. 4 shows a block schematic of relevant parts of a processing entity determining unit present in the first robot controller of FIG. 3.

FIG. 4 shows a block schematic of some of the elements of the processing entity determining unit 44. It comprises a processing capability receiving block PCR 48, a processing environment limitation block PEL 50, a performance requirement fulfillment determination block PRFD 52, a processing task assigning block PTA 54 and a cloud computing calling block CCC 55.

As was mentioned earlier, the processing entity determining unit 44 may be provided through the processor 38 and memory 40. It may therefore as an example be provided in the form of a processor with an associated computer program code. It may thus be provided as a program code in the memory 40 being run by the processor 38. As an alternative the processing entity determining unit 44 may be provided in the form of an Application Specific Integrated Circuit (ASIC) or Field-Programmable Gate Array (FPGA).

The processing entity determining unit is furthermore provided in an arrangement for distributing processing for a first robot in a cell among more than one processing entities. In the above given example this arrangement is provided as the first robot controller 20. It should also be realized that the processing entity determining unit 44 is not necessarily provided in the first robot controller 20. It may as an example be provided in another processing entity of the cell. It may even be provided in a separate processing entity connected to the local communication network 33 and may in this case be grouped together with other processing entity determining units provided for other cells. In such a case any such processing entity will form the arrangement.

The processor 38 and memory 40 of the first robot controller 20 may be involved in processing for the first robot 12 in order to perform various activities along the first robot movement path. The processing may involve generating positions that the first tool 16 is to be moved to, and performing commands or actions by the first tool 16. However, it may also involve other types of processing such as image processing in order to detect objects to be picked and processing determining which object to pick.

This processing may be heavy in that a high amount of processing resources may be required to perform the task, such as a lot of processing power and/or a lot of memory space. If such heavy computer processing is performed in the first robot controller 20, then the other activities being performed by the first robot controller 20, such as the control of the movement of the robot, may be affected, for instance through not enough processing resources being left for performing the activity. The robot application performance may thus be negatively influenced.

As was mentioned initially there exists a need for a more versatile and flexible use of processing resources in relation to the control of a robot.

The present invention is provided for addressing this and related issues.

For instance, the Quality of Service (QoS) of a robot cell can be affected by a number of processing environment limitations, such as through the parameters: network bandwidth, processor performance, storage capacity, available memory, amount of data or feed of data, etc.

As an example, the network bandwidth can affect feeding of large data sets to and getting real-time feedback from processing that has been designed to be executed in the cloud. Likewise, if there are processing resource constraints in some robot controllers, the computation that has been designed to be executed locally on these specific robot controllers will negatively impact the robot application performance.

If such computations can be redirected to the cloud or to other local robot controllers with available processing resources dynamically in runtime depending on the changing conditions of the above mentioned parameters, it would be possible to meet the timing and deterministic requirements (QoS) of robot applications.

Therefore one proposed idea is to, depending on a collection of processing environment limitations, for instance parameters such as network bandwidth, processor performance, storage capacity, available memory, amount or feed of data, dynamically send heavy real-time analytics computations to robot controllers with available processing resources or cloud, and receive results from these processing resources to improve quality of service without jeopardizing the latency of service.

Figure 5:
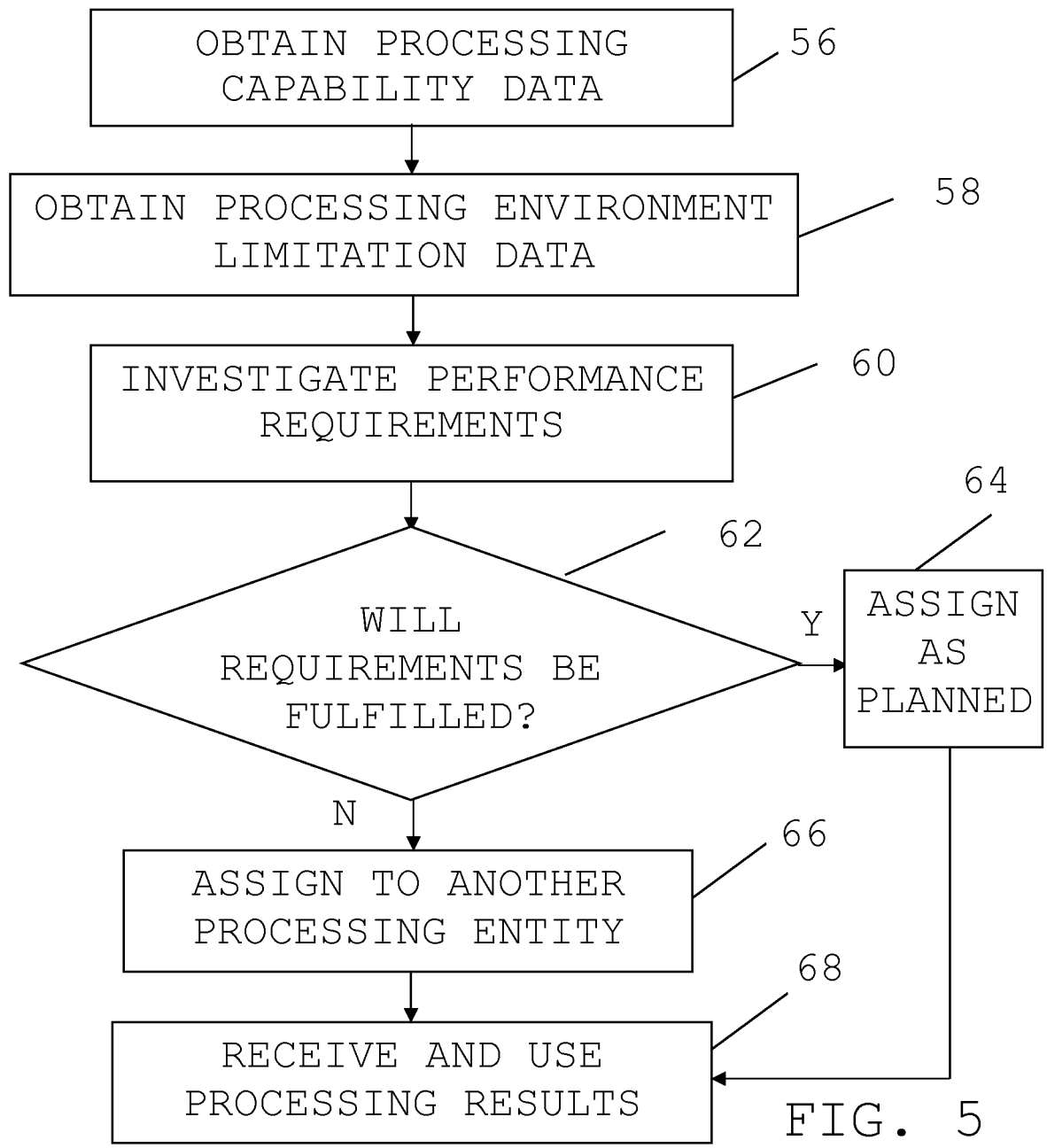
FIG. 5 shows a number of method steps being performed by the processing entity determining unit in a method for distribution processing for a robot among a number of processing entities, and FIG. 6 schematically shows a computer program product in the form of a CD Rom disc comprising computer program code for performing the functionality of the processing entity determining unit when being loaded into a processor.

A first embodiment of the invention will now be described with reference also being made to FIG. 5, which shows a flow chart of a number of method steps being performed by the processing entity determining unit 44 in a method for distribution processing for a robot among a number of processing entities.

The method is carried out with respect to a prospective processing entity in relation to the first robot 12, where the prospective processing entity is a processing entity that it is desired or intended to use for performing a processing task. As a first example this prospective processing entity may be the first robot controller 20. However, it is in fact possible that the prospective processing entity is another processing entity, for instance the cloud computer 36.

As a computational task is to be performed for the first robot 12, the processing capability receiving block 48 may initially obtain data, for instance through receiving said data, about the processing capabilities of the various processing entities in the cell not intended to perform the processing task, step 56, which in the present example is the processing capabilities of the second robot controller 28, the first additional processing entity 30 and the second additional processing entity 32. The other processing entities may therefore be processing entities involved in computational activities in the cell 10. However, also the cloud computing device 36, which is reachable via the public communication network 35, is a candidate. It is therefore possible that also the cloud computing device 36 reports such processing capability. Alternatively the cloud computing device 36 may be considered to have virtually unlimited processing capabilities. The processing capability data may comprise data about the available processing power and/or the available memory of the corresponding processing entity.

Thereafter the processing environment limitation block 50 obtains data about current limitations in the processing environment of the prospective processing entity intended for carrying out the processing task, step 58. This data may comprise data of the available processing resources in the prospective processing entity, i.e. processing resources that are free to be used in the prospective processing entity. In the case of the prospective processing entity being the first robot controller 20, the processing environment limitation block may obtain data of the processing power or processing capability of the processor 38, such as a current level of unused or available processing power. It may also comprise data about a current available storage capacity of the memory 40. Such data may be obtained through the processing environment limitation block 50 investigating the current usage of the processor 38 and current usage of the memory 40.

The processing environment limitation data may furthermore comprise data about communication limitations, such as bandwidth of the local communication network 33 and communication bandwidth for communication with the cloud computing device 36. Such data may be obtained via the communication interface 42 and the cloud computing calling block 55. It can thus be seen that the processing environment limitation data may comprise bandwidth limitations in communication between the first robot controller and the prospective processing entity. The communication limitation of the local communication network 33 may for instance be obtained through sending a ping in the local communication network 33 and determining the communication delay based on the responses to it from other processing entities in the local communication network 33. It is also possible to use pre-knowledge of the bandwidth limitation of the local communication network 33. Similar strategies may be used for determining the communication limitations related to the cloud computing device 36. Furthermore, in case the cloud computer calling unit 55 is provided in another processing entity than the first robot controller 20 then it may be necessary to consider both the communication bandwidth of the local communication network 33 and the communication bandwidth of the communication with the cloud computing device 36.

Communication limitations may especially be of interest if the prospective processing entity is another processing entity than the first robot controller 20.

Thereafter the performance requirement fulfillment determining block 52 investigates if the processing task when hypothetically being carried out on the prospective processing entity will lead to performance requirements of the cell being fulfilled or not, step 60. Thereby it determines, based on the current processing environment limitations, whether the performance requirements will be fulfilled or not if the task is performed in the prospective processing entity. The performance requirements may comprise quality of service (QoS) requirements such as required speed of operation of the robot control and the granularity of the processing. The investigation may more particularly be an investigation as to whether the available processing resources are sufficient for performing the processing task. Put differently, the investigation may be an investigation as to whether the processing resources required for the processing task match the available processing resources of the processing environment limitation data.

It is also possible to predict the processing resources needed for performing the computational task and to compare the predicted computational resources with the available computational resources.

In case the available processing resources of the processing environment limitation data are equal to or surpass the processing resources required for the processing task, such as if there is enough processing power and memory space, then the performance requirements may be deemed to be fulfilled, and otherwise that they are not. The granularity requirement may also influence the processing resource requirements. A fine granularity may for instance increase the required processing resources.

In addition or instead it is possible that timing requirements of the processing task are investigated. There may more particularly be a determination of if a time for delivering the processing results from the prospective processing entity is within a maximum time limit for controlling the robot. The time that it takes to deliver results of the processing from the prospective processing entity to robot control functionality of the first robot controller 20 may in this case be compared with a maximum allowed time limit for carrying out a robot activity, where also the time to deliver results may be predicted, for instance using regression.

The time limit may be a time limit corresponding to a maximum time for the first robot 12 to carry out an activity using the first tool 16 based on the processing of the processing task. The time being compared may be the time from the first robot controller 20 finishing a previous task to the time at which the processing result of the processing task is deemed to reach the first robot controller. This time limit may thus be a maximum allowed time for receiving the processing result for a robot operation corresponding to the processing task to be finished in time.

The performance requirement fulfillment determining block 52 thus determines if the performance requirements of the cell will be fulfilled or not in case the processing task for the first robot is performed by the prospective processing entity with its corresponding processing environment limitations.

The performance requirement fulfillment determining block 52 thus investigates if the QoS of operation of the robot cell will be fulfilled or not when the processing task in question is performed in the prospective processing entity.

In case the prospective processing entity being the first robot controller 20, the investigation may be an investigation if there is enough memory and processing power for performing the task, according to the processing resources requirements of the task and determining if the processing time is within the time limit.

In case the prospective processing entity is another processing resource of the cell, then the same type of considerations may be made for the prospective processing resource, for instance for the second robot controller 28. In this case the available processing resources of the second robot controller are compared with the processing resources required by the task. Furthermore, in this case it is possible that also the communication time of the local communication network 33 is considered in the fulfillment of the timing requirements. The maximum allowed time may in this case be compared with a time at which the task assignment is sent from the first robot controller 20 to the second robot controller 28 to the time when the first robot controller receives the result of the processing.

If the prospective processing entity is the cloud computing device 36, then the use of the processing resources as such has no real influence on the fulfillment of the performance requirements. The processing resources of the cloud may be deemed to always match the processing resources required for the processing task. However, the communication time used in the local communication network as well as the communication time for communicating with the cloud computing device may in this case have impact on whether the performance requirements are fulfilled or not. Therefore, in this case it is possible that only the timing requirements are investigated when determining if the performance requirements are fulfilled or not. The maximum allowed time may also in this case be compared with a time at which the task assignment is sent from the first robot controller 20 to the cloud computing device 36 to the time when the first robot controller 20 receives the result of the processing. Thereby also the bandwidths of the cloud computing communication and the local communication network are considered.

If the performance requirement fulfillment determining block 52 finds that the processing of the prospective processing entity fulfills the processing requirements, step 62, then the processing task assigning block assigns the processing to the prospective processing entity, step 64. Otherwise, step 62, the processing task assigning block assigns the processing to at least one other processing entity, step 66. The performance requirement fulfillment determining block thus assigns the processing task for processing in the prospective processing entity and/or in at least one other processing entity based on the determining of whether the performance requirements are fulfilled or not.

In some cases it is possible to divide the processing task into subparts. In this case the subparts may be assigned to different processing entities. In other instances this is not possible, in which case the processing task has to be handled by a single processing entity.

In the present example the prospective processing entity is the first robot controller 20, which means that the task is assigned to the processor 38 and memory 40 for being carried out there if the performance requirements were found to be fulfilled. In case the prospective processing entity was the cloud computing device 36, then the processing task assigning block 54 would connect to the cloud computer calling block 55, which would in turn connect to the cloud computing device 36 via the communication interface 42 and gateway 34 if the performance requirements were found to be fulfilled. In case the prospective processing entity is another processing entity in the cell, such as the second robot controller 28, then the processing task assigning block 54 would connect to the second robot controller 28 via the communication interface 42 using the local communication network if the performance requirements were found to be fulfilled.

As was mentioned above, if the prospective processing entity did not fulfill the processing requirements, then the task is assigned to at least one other processing entity.

Here it is also possible that the at least one other processing entity to which the processing task is assigned is one for which the performance requirements will be fulfilled.

It is possible that there is only one other processing entity, such as the cloud computing device 36. In this case this may be directly selected instead of the prospective processing entity. However, if there are several other processing entities, it is possible that another processing entity is selected based on if it is deemed to enable the cell to meet or fulfill the performance requirements or not. The selection may therefore be made based on the obtained processing capabilities. It is for instance possible that the performance requirement fulfillment determining block 52 investigates the processing capability data of the other processing entities obtained by the processing capability receiving block 48 to see if they fulfill the processing and timing requirements, i.e. if they have the processing resources required for the task and the results can be delivered timely. The investigation may more particularly involve investigating if any robot controller has the capacity to perform the task and deliver a timely processing result. There may also exist different priorities between the alternatives that are found to be acceptable.

When the assigned processing entity is finished with the processing, the result may then be provided to the previously mentioned robot control functionality of the first robot controller 20, which is implemented by the processor 38 and memory 40. The robot control functionality, which thus receives the result of the assigned processing task from the used processing entity, may then perform an activity corresponding to or based on the processing, step 68. It may more particularly control the robot using the processing result. If for instance a certain object is selected based on image processing and advanced computations, it is possible that the actual movement to the selected object is performed by the robot control functionality.

The above type of operation may thereafter be repeated when a new computational task is to be performed. It can thereby be seen that the computational tasks are dynamically assigned in real-time based on processing environment limitations.

It can in this way be seen that a part of the computation may be done locally on the first robot controller 20, and can be dynamically redirected to other processing entities with available processing resources, such as to the second robot controller 28 and the further processing entities 30 and 32. One of these may thus receive the task if there is constraint in processor performance, storage capacity, and/or memory on the first robot controller.

As was mentioned above, execution of computationally intensive tasks for robot applications requires real-time response to ensure Quality of Service (QoS). However, parameters such as network bandwidth, processor performance, storage capacity, available memory, amount or feed of data do affect QoS. Therefore, there is proposed a flexibility redirecting computation services to other processing entities associated with a cell (perhaps except for some low latency computations that must be done locally) with computational power based on the changing conditions of the above parameters. These parameters may need to be modeled to determine in runtime where to move computation and data and receive computation results to achieve the required QoS without jeopardizing latency of service.

For this, an algorithm that deals with moving data/services to powerful computational power, servers and receiving results from the servers is proposed. This algorithm can be used to make the decision on which data or services should be redirected either to the cloud or to other processing entities of the cell, such as other local robot controllers, so that the systems QoS requirements can be met. The algorithm may focus on meeting the QoS requirements, e.g., timing constraints of tasks or minimizing the response times. The algorithm may furthermore be based on an algorithm in which regression is used to predict when the tasks execution time exceeds a certain limit and starts preparing to redirect computations to available processing resources to prevent violating the timing constraints, such an algorithm is described by L. L. Ferreira, G. Silva, and L. M. Pinho in "Service offloading in adaptive real-time systems", 16th IEEE Conference on Emerging Technologies & Factory Automation (ETFA), pp. 1-6, 2011, which is herein incorporated by reference.

The robot vision algorithm computation is as an example applicable to the proposed idea. Vision systems enable robots to perform operations with improved performance. For instance, robots guided by a vision system can locate parts to be picked up, determine where to apply a weld, inspect parts that have been assembled, and determine where to place a part. A vision system provides feedback signals that are essential for robot controllers to perform these operations precisely, which requires huge amount of computations involving image processing algorithms, vision sensory feedback and complicated signal processing. Part of the vision algorithm computation can be moved up to the cloud. Part of the computation is done locally on robot controller, and can be dynamically redirected to other robot controllers with available processing resources if there is constraint in processor performance, storage capacity, and/or memory on a specific robot controller.

The invention has a number of advantages. It improves QoS by dynamically redirecting computation and data to a more powerful processing entity for executing computationally intensive robotics services that require real-time response. Thereby there is also an increase flexibility.

Figure 6:
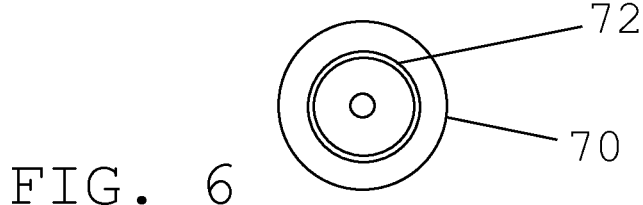

The processing entity determining unit was above described as being provided in the form of one or more processors together with computer program memory including computer program code for performing its function. As an alternative it may be provided in the form of an Application Specific Integrated Circuit (ASIC) or Field-Programmable Gate Array (FPGA). This computer program code may also be provided on one or more data carriers which perform the functionality of the processing entity determining unit when the program code thereon is being loaded in a processing entity of the cell where the processing entity determining unit is to be provided. One such data carrier 70 with computer program code 72, in the form of a CD ROM disc, is schematically shown in FIG. 6. Such computer program may as an alternative be provided on a server and downloaded therefrom into the processing entity in question.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for distributing processing for a first robot in a cell among more than one processing entities, the first robot being controlled by a first robot controller that is also one of the processing entities, the method being performed by a processing entity determining unit and including the steps of:
    obtaining data about current limitations in the processing environment of a prospective processing entity intended to perform a processing task for the first robot,
    determining, based on said processing environment limitations, whether a performance requirement will be fulfilled or not if the task is performed in the prospective processing entity, and
    assigning the processing task for processing in the prospective processing entity and/or in at least one other processing entity based on the determining of whether the performance requirement is fulfilled or not.

2. The method according to claim 1, further including receiving the result of the assigned task from the used processing entity and controlling, via the first robot controller, the first robot using the result.

3. The method according to claim 1, wherein the determining of whether the performance requirement is fulfilled or not includes determining if a time for delivering the processing results from the prospective processing entity is within a maximum time limit for controlling the first robot.

4. The method according to claim 3, wherein the time of delivering the processing results from the prospective processing entity is predicted.

5. The method according to claim 4, wherein the processing environment limitation data includes any bandwidth limitations in communication between the first robot controller and the prospective processing entity.

6. The method according to claim 3, wherein the processing environment limitation data includes any bandwidth limitations in communication between the first robot controller and the prospective processing entity.

7. The method according to claim 1, wherein the processing environment limitation data includes data about available processing resources in the prospective processing entity intended to perform the processing task and the determining of whether the performance requirement is fulfilled or not includes determining if the available processing resources are sufficient for performing the processing task or not.

8. The method according to claim 1, wherein there are more than one further processing entities and the at least one other processing entity to which the processing task is assigned is one for which the performance requirements will be fulfilled.

9. The method according to claim 1, wherein the prospective processing entity is the first robot controller.

10. The method according to claim 1, wherein the at least one other processing entity includes a cloud computing device reachable via a public communication network.

11. The method according to claim 1, wherein the at least one other processing entity includes a processing entity involved in computational activities in the cell.

12. The method according to claim 11, further including receiving, from processing entities of the cell, indications of their processing capabilities and the assigning of the processing task for processing in at least one other processing entity includes selecting a processing entity in the cell based on the obtained processing capabilities.

13. The method according to claim 12, wherein the at least one other processing entity includes a second robot controller controlling a second robot in the cell.

14. The method according to claim 11, wherein the at least one other processing entity includes a second robot controller controlling a second robot in the cell.

15. The method according to claim 14, wherein the first and the second robots are a part of the same collaborative group.

16. An arrangement for distributing processing for a first robot in a cell among more than one processing entities, the first robot being controlled by a first robot controller that is also one of the processing entities, the arrangement including a processing entity determining unit configured to
    obtain data about current limitations in the processing environment of a prospective processing entity intended to perform a processing task for the first robot, determine, based on said processing environment limitations, whether a performance requirement will be fulfilled or not if the task is performed in the prospective processing entity, and assign the processing task for processing in the prospective processing entity and/or in at least one other processing entity based on the determining of whether the performance requirement is fulfilled or not.

17. The arrangement according to claim 16, further including the first robot controller including robot control functionality configured to receive the result of the assigned task from the used processing entity and control the first robot using the result.

* * * * *